United States Patent
Serov et al.

(10) Patent No.: US 9,673,456 B2
(45) Date of Patent: Jun. 6, 2017

(54) NON-PGM CATALYSTS FOR ORR BASED ON CHARGE TRANSFER ORGANIC COMPLEXES

(71) Applicants: Alexey Serov, Albuquerque, NM (US); Plamen B Atanassov, Santa Fe, NM (US)

(72) Inventors: Alexey Serov, Albuquerque, NM (US); Plamen B Atanassov, Santa Fe, NM (US)

(*) Notice: Subject to any disclaimer, the term of this patent is extended or adjusted under 35 U.S.C. 154(b) by 0 days.

(21) Appl. No.: 14/761,390

(22) PCT Filed: Jan. 16, 2014

(86) PCT No.: PCT/US2014/011774
§ 371 (c)(1),
(2) Date: Jul. 16, 2015

(87) PCT Pub. No.: WO2014/113525
PCT Pub. Date: Jul. 24, 2014

(65) Prior Publication Data
US 2015/0357652 A1 Dec. 10, 2015

Related U.S. Application Data

(60) Provisional application No. 61/753,123, filed on Jan. 16, 2013.

(51) Int. Cl.
*B01J 23/745* (2006.01)
*H01M 4/90* (2006.01)
(Continued)

(52) U.S. Cl.
CPC ....... *H01M 4/9041* (2013.01); *H01M 4/9091* (2013.01); *B01J 27/24* (2013.01);
(Continued)

(58) Field of Classification Search
CPC ........ B01J 37/06; B01J 35/10; B01J 35/0033; B01J 37/086; B01J 37/088; B01J 27/24;
(Continued)

(56) References Cited

U.S. PATENT DOCUMENTS 7,678,728 B2    3/2010   Olson et al.
2001/0038821 A1    11/2001   Petrie et al.
(Continued)

FOREIGN PATENT DOCUMENTS

JP    2007-273371    * 10/2007  ............. H01M 4/86
JP    2007-273371 A    10/2007
(Continued)

OTHER PUBLICATIONS

Nallathambi et al, "Nitrogen Precursor Effects in Iron-Nitrogen-Carbon Oxygen Reduction Catalysts" Electrochemical and Solid-State Letters, 14 (6) B55-B58 (2011).
(Continued)

*Primary Examiner* — Patricia L Hailey
(74) *Attorney, Agent, or Firm* — Gonzales Patent Services; Ellen M. Gonzales (57) ABSTRACT

A sacrificial support-based method, a mechanosynthesis-based method, and a combined sacrificial support/mechanosynthesis support based method that enables the production of supported or unsupported catalytic materials and/or the synthesis of catalytic materials from both soluble and insoluble transition metal and charge transfer salt materials.

19 Claims, 5 Drawing Sheets

SEM (51) Int. Cl.
*B01J 37/06* (2006.01)
*B01J 37/08* (2006.01)
*B01J 27/24* (2006.01)
*B01J 35/00* (2006.01)
*B01J 35/10* (2006.01)
*B01J 37/00* (2006.01)

(52) U.S. Cl.
CPC ............ *B01J 35/0033* (2013.01); *B01J 35/10* (2013.01); *B01J 37/0036* (2013.01); *B01J 37/06* (2013.01); *B01J 37/086* (2013.01)

(58) Field of Classification Search
CPC .. B01J 37/0018; B01J 37/0036; B01J 23/745; H01M 4/9091
USPC ......................................... 502/167, 174, 338
See application file for complete search history.

(56) References Cited

U.S. PATENT DOCUMENTS

| | | | | |
|---|---|---|---|---|
| 2008/0312073 | A1* | 12/2008 | Olson | ...................... B01J 31/06 502/164 |
| 2011/0287174 | A1 | 11/2011 | Calabrese Barton et al. | |
| 2011/0294658 | A1 | 12/2011 | Lefevre et al. | |
| 2014/0349843 | A1* | 11/2014 | Patterson | ............ H01M 4/9041 502/182 |
| 2015/0295248 | A1* | 10/2015 | Serov | ...................... H01M 4/90 502/159 |

FOREIGN PATENT DOCUMENTS

| WO | 2012174335 A2 | 12/2012 |
|---|---|---|
| WO | 2012174344 A2 | 12/2012 |

OTHER PUBLICATIONS

Groshens et al., "Metal vapor synthesis, chemical oxidation, and and electrochemistryof bis(bipyridyl)cobalt(0). Preparation of bromide, tetracyanoethylene, and tetracyanoquinodimethane salts," Inorganic Chemistry, vol. 20, No. 11, p. 3629-3635 Nov. 1, 1981.

Rogers et al., "Nicarbazim complex yields dinitrocarbanilide as ultrafine crystals with improvide anticoccidial activity," Science, vol. 222, No. 4624, p. 630-632 Nov. 11, 1983.

* cited by examiner

NON-PGM CATALYSTS FOR ORR BASED ON CHARGE TRANSFER ORGANIC COMPLEXES

CROSS-REFERENCE TO RELATED APPLICATIONS

The following application claims benefit of U.S. Provisional Application No. 61/753,123, filed Jan. 16, 2013, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

SUMMARY

In general, the present disclosure provides novel materials and methods for making the same.

According to an embodiment, the present disclosure provides a method of preparation of novel non-platinum group metal (PGM) catalytic materials utilizing a sacrificial support-based approach and using inexpensive and readily available precursors including precursors of transition metals and charge transfer salts enriched with nitrogen that is useful in different applications including fuel cells.

According to another embodiments, the present disclosure provides a method of preparation of novel non-platinum group metal materials utilizing a mechanosynthesis-based approach.

According to still another embodiment, the present disclosure provides a method of preparation of novel non-platinum group metal materials utilizing a combination of the mechanosynthesis and sacrificial support-based approaches.

According to yet another embodiments, the present disclosure provides novel non-platinum group metal catalytic materials formed from the methods above.

DETAILED DESCRIPTION

In general, the present disclosure provides novel materials and methods for making the same. According to an embodiment, the present disclosure provides novel catalysts and catalytic materials and methods for making the same. In contrast to many previously described methods of producing M-N—C-based catalytic materials, which involve the dispersion of precursor materials on a solid support, the present disclosure provides a sacrificial support-based method, a mechanosynthesis-based method, and a combined sacrificial support/mechanosynthesis support based method that enables the production of supported or unsupported catalytic materials and/or the synthesis of catalytic materials from both soluble and insoluble materials. Furthermore, because the methods disclosed herein can be used to produce catalytic materials having a well-defined morphology, and in particular, a well-defined porous morphology, the catalytic materials described herein can be tailored to meet application-specific needs in terms of size, shape, and activity.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

According to a more specific example, a catalytic material according to the present disclosure may be synthesized utilizing a sacrificial support-based method. For the purposes of the present disclosure, the term "sacrificial support" is intended to mean a material which is used during the synthesis process to provide a temporary structural support, but which is mostly or entirely removed during the synthesis step. According to one embodiment of this particular method, a sacrificial support is infused M-N—C precursors wherein the metal is provided by one or more transition metal precursors and the nitrogen and carbon are provided by one or more charge transfer salt precursors. According to some specific embodiments, the transition metal may be iron. Suitable iron precursors include, but are not limited to, iron nitrate, iron sulfate, iron acetate, iron chloride, etc. Furthermore, it will be appreciated that other transition metals such as Ce, Cr, Cu Mo, Ni, Ru, Ta, Ti, V, W, and Zr can be substituted in place of iron, by simply using precursors of those metals instead. Exemplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tungtanate and zirconium nitrate. Furthermore, according to some embodiments the presently described methodologies may utilize precursors of two or more metals to produce multimetallic catalysts. In general, charge transfer salts are defined as an association of two or more molecules or atoms, or of different parts of one large molecule, in which a fraction of an electronic charge is transferred between the molecular or atomic entities. According to some specific embodiments, the charge transfer salt maybe a nitrogen enriched charge transfer salt such as nicarbazin. Other suitable charge transfer salts include, but are not limited to tetracyanoquinodimethane, tetrathiafulvalene, and multiferroics.

For the purposes of the present disclosure, the term "precursor" is used to refer to a compound which participates in a chemical reaction by contributing one or more atoms to a compound that is formed as the product of the chemical reaction or otherwise contributes to the formation of the product. For example in generating a gaseous product that creates a small pore or void in the final product or in helping create the chemical structure of the final product as in the case of nickel nanoparticles leading to the growth of carbon fibers.

It will be appreciated that the sacrificial support may be synthesized and infused in a single synthesis step or the sacrificial support may be synthesized first (or otherwise obtained) and then infused with the charge transfer salt precursor(s) and the appropriate/desired transition metal precursor(s). The infused sacrificial support is then subjected to heat treatment, (such as Pyrolysis) in an inert (N$_2$, Ar, He, etc.) or reactive (NH$_3$, acetonitrile, etc.) atmosphere.

Of course it will be appreciated that given the high temperatures that the sacrificial support will be subjected to during the synthesis method, it is important to select a sacrificial support which is non-reactive to the catalytic materials under the specific synthesis conditions used. Accordingly, it will be appreciated that silica is a preferred material for the sacrificial support, but that other suitable materials may be used. Other suitable sacrificial supports include, but are not limited to zeolites, aluminas, and other metal oxides, sulfides, nitrides, or mixtures. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated that the size and shape of the silica particles may be selected according to the desired shape(s) and size(s) of the voids within the electrocatalyst material. Accordingly, by selecting the particular size and shape of silica particles, one can produce an electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, silica particles having a characteristic length of between 1 nm and 100 nm, in more preferred embodiments, silica particles having characteristic lengths of between 100 nm and 1000 nm may be used and in other preferred embodiments, silica particles having characteristic lengths of between 1 mm and 10 mm may be used. Further mesoporous silica can also be used in the templating synthesis approach. In this case the templating involves intercalating the mesopores of the material and results in a self-supported electrocatalysts with porosity in the 2-20 nm range. In one particular embodiment, the silica template is Cab-O-Sil amorphous fumed silica (325 m$^2$/g). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above, after deposition and/or impregnation of the charge transfer salt and metal precursors on the sacrificial support, the material is heat treated either in an inert atmosphere such as $N_2$, Ar, or He, or in a reactive atmosphere such as $NH_3$ or acetonitrile. Inert atmospheres are typically used when the infused materials are nitrogen rich, as the inert atmosphere enables the production of a high number of active sites with Fe (or other metal) N4 centers. However, it may be desired to use a nitrogen rich atmosphere if infused material is rich in carbon and depleted in nitrogen, as the nitrogen rich atmosphere will enable production of the Fe (or other metal) nitrogenous, including N4, centers. As described in greater detail in the experimental section below, according to some preferred embodiments, the materials of the present are subjected to heat treatment in a reactive atmosphere.

According to some embodiments, particularly embodiments wherein a single step synthesis method is used, optimal temperatures for heat treatment are typically between 500° C. and 1100° C. According to some embodiments, heat treatment may preferably be between 800° C. and 1000° C., or more preferably between 875° C. and 925° C. In some embodiments, heat treatment of around 900° C. is preferred, as our experimental data showed that materials heat treated at this temperature for 1 hour produced catalysts having a high amount of catalytic activity for certain specific materials (see experimental section below).

After heat treatment, the sacrificial support is removed resulting in a porous, unsupported catalytic material. In some cases the porous, nonsupported catalytic material consists only of materials derived from the initial precursor materials. Removal of the sacrificial support may be achieved using any suitable means. For example, the sacrificial support may be removed via chemical or thermal etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

As stated above, the presently described catalytic materials can also be synthesized using a double heat treatment procedure. In this procedure, the charge transfer salt and metal precursors are infused in the sacrificial support, which is then subjected to a first heat treatment step, such as pyrolysis in order to produce an intermediate material that is rich with unreacted iron. According to some embodiments, the sacrificial support can be removed after the first heat treatment using chemical etching or other suitable means as described above. The intermediate material is then subjected to a second heat treatment step, which may be, for example, a second pyrolysis treatment, resulting in newly formed active sites. This second heat treatment step can also be useful for removing any volatile species (such as HF) that may have been introduced during chemical etching, if performed, can introduce desirable surface defects and can extend the open-pore structure that was original created by the sacrificial support. If the sacrificial support is not removed after the first heat treatment step, it can be removed after the second heat treatment step, again using the methods described above.

In embodiments utilizing a double heat treatment procedure, it may be desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a temperature between 800 and 1000° C. for a period of time between 10 minutes and 1 hour.

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. According to an exemplary method, the charge transfer salt and metal precursor materials described herein are mixed with a silica support, atomized, and dried in a tube furnace. The powder obtained from this procedure is then collected on a filter. The collected powder is then heat treated. Finally, the sacrificial support is removed, for example by leaching with HF or KOH.

It will be appreciated that the above-described large-scale production method is suitable for use for a wide variety of precursors and materials and thus not necessarily limited to the catalysts disclosed herein.

According to another embodiment, the present disclosure provides a method for forming non-PGM catalytic materials utilizing a mechanosynthesis based approach. The herein described mechanosynthesis-based approach enables, for example, the preparation of a variety of materials including, but not limited to, catalytic materials formed from insoluble materials. The method employs ball-milling and may or may not utilize a support, which may or may not be sacrificial. Of course it will be appreciated that while the method does not require the addition of solvents, solvents may be used, if desired.

Ball-milling has been described previously in referenced to M-N—C catalyst material synthesis as a method for filling the pores of a carbon support with a pore-filler. See e.g., Jaouen et al. [44]. However, in the methods described in the present disclosure, ball-milling is used to enable mechanosynthesis, alleviating the need for solvent-based preparation methods. For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of a catalyst. In general, for the purposes of the present disclosure, the ball mill used should be capable of producing enough energy to initiate the desired chemical reaction or achieve the desired level of mixing.

In general, the presently described methods utilize the energy produced by ball-milling of the various precursor materials to drive a chemical reaction between the precursors. According to a more specific example, a catalytic material according to the present disclosure may be synthesized by ball milling the charge transfer salt and transition metal precursors under sufficient conditions to initiate polymerization of the various precursors, thereby forming (or initiating formation of) an M-N—C polymer. The M-N—C polymer is then subjected to heat treatment, (such as pyrolysis) in an inert ($N_2$, Ar, He, etc.) or reactive ($NH_3$, acetonitrile, etc.) atmosphere at a sufficient temperature to produce a catalytic material. According to some embodiments, the entire process is performed dry, by which is meant, without the presence of any added solvents. According to one embodiment of a solvent-free process, all reactants (i.e. precursors) are combined in a ball mill in powder form and the entire process is conducted without the addition of any liquids. According to some embodiments, a supporting material, which may or may not be sacrificial may also be included. For the purposes of the present disclosure, a powder is a dry, bulk solid composed of a large number of very fine particles that may flow freely when shaken or tilted. Because the method can be practiced without the presence of any solvents, the method enables the synthesis of catalysts formed from insoluble materials. Examples of insoluble materials which can be used to form catalysts according to the present disclosure include, but are not limited to polyacrylonitrile, melamine, polyurethane etc.

Exemplary characteristics which may be examined with regard to the selection of nitrogen, carbon, or nitrogen-carbon precursors used for producing catalytic materials as described herein include, but are not limited to: (1) carbon content; (2) nitrogen content; and (3) thermal stability, i.e. the volatility of the molecules and resistance to decomposition due to heating. The degree of carbon content is related to the porosity of the final product, where carbon content is inversely related to more open final structure. For example, according to some embodiments, a porous, open-frame matrix will be formed if each molecule of the carbon precursor contains, on average, at least 5 carbon atoms. Depending on whether the plan is to perform synthesis in an inert or nitrogen-rich environment, the nitrogen richness of the precursor may need to be taken into account. For example, if synthesis is to be performed in an inert atmosphere, the precursor must have a substantial amount of nitrogen, since all the active $M-N_x$ centers must be formed from nitrogen contained in the precursor itself. Finally, precursors should be chosen which will remain stable under the thermal conditions to be used. For example, if the methodology to be used requires pyrolysis at a temperature of above 700° C. (a minimum temperature frequently required for active-site formation), it is important that the precursor remain stable at temperatures above 700° C.

According to some embodiments the M-N—C precursors described herein are ball-milled in the presence of supporting material so as to enable infusion of the M-N—C precursors on, around, and throughout (if the supporting material is porous) the supporting material. Examples of suitable supporting materials include, but are not limited to carbon blacks, carbon nanotubes, conductive oxides or nitrides such as Indium Tin oxide or Molybdenum Nitride etc. or materials that may not be initially conductive but may be made so after processing, such as $TiO_2$ that can be made conductive after chemical or thermal reduction or oxygen content or post synthesis doping The inclusion of a supporting material in the ball-milling process results in a supported catalytic material. The supporting material may be active or inert, and may contribute or not contribute to the catalytic material's catalytic activity.

According to a still further embodiment, non-PGM catalytic materials may be formed using a method that combines both the ball-milling and sacrificial support-based techniques described above. According to these embodiments, the M-N—C precursors described herein are ball-milled in the presence of a sacrificial support, which is then removed after the pyrolysis as described above, resulting in a porous, non-supported catalytic material. In some cases the porous, nonsupported catalytic material consists only of materials derived from the initial precursor materials.

The specific methods and compositions described herein are representative of preferred embodiments and are exemplary and not intended as limitations on the scope of the invention. For example, while much of the above-description has been directed towards catalytic materials for use in fuel cells, it should be understood that the materials and methods disclosed herein may be useful for other catalytic or non-catalytic materials and in other applications, which may or may not involve catalysis. As non-limiting examples, the materials disclosed herein may be useful as liquid storage or as absorbents. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below. The reaction tests shown and described in the drawings and in the following examples clearly demonstrate that catalysts prepared using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, catalysts of the composition and using the preparation method described herein, including but not limited to the described materials shown herein, are effective catalysts for oxygen reduction.

Examples I

Synthesis of Catalytic Material from Iron and Nicarbazin Precursors Using Sacrificial Support-Based Method First, a calculated amount of silica (Cab-O-Sil® MSP, surface area 125 m2 g–1) was dispersed in water using a high energy ultrasound probe. Then, a suspension of nicarbazin (Nicarbazin, Sigma-Aldrich) in acetone was added to silica and sonicated for 20 minutes in an ultrasound bath. Finally, a solution of iron nitrate (Fe(NO3)3*9H2O, Sigma-Aldrich) was added to the SiO2-NCB solution and ultrasonicated for 8 hours (the total metal loading on silica was calculated to be ~20 wt. %). After ultrasonication, the viscous gel of silica and Fe-NCB was dried overnight at T=85° C. The obtained solid was ground to a fine powder in an agate mortar and then subjected to heat treatment (HT). The general conditions of HT were UHP nitrogen (flow rate of 100 cc min-1), 20 deg min-1 temperature ramp rate. The experimental variable component of heat-time trajectory were temperatures and duration of HT (900° C., 1 hour; 950° C., 30 minutes and 950° C., 1 hour). After heat treatment, silica was leached using 25 wt. % HF overnight. Finally, the Fe-NCB catalyst was washed with DI water until neutral pH was achieved and then dried at T=85° C. A second heat treatment was performed at T=950° C. in reactive ($NH_3$) atmospheres.

Figure 1:
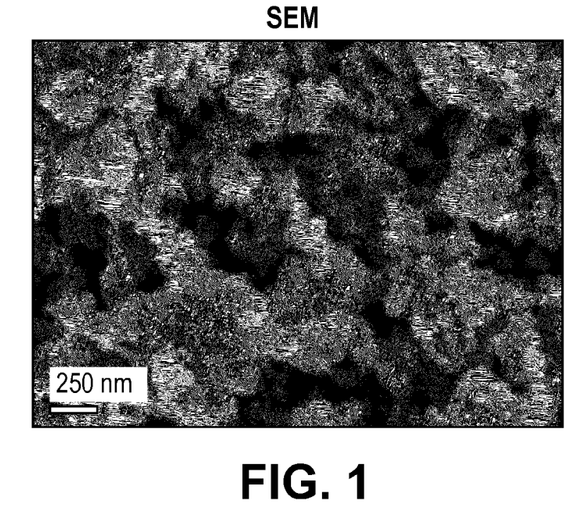
FIG. 1 is an SEM image of an Fe-NCB catalyst produced using the methods described herein.
Figure 2:
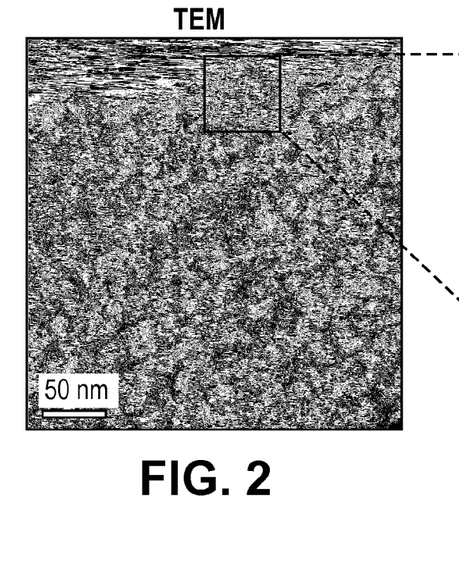
FIG. 2 is a TEM image of the Fe-NCB catalyst of FIG. 1.
Figure 3:
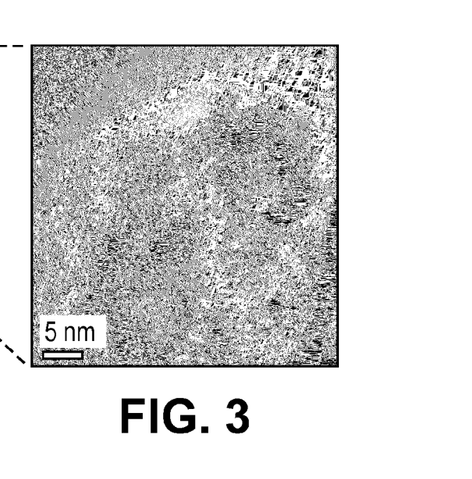
FIG. 3 is a high resolution TEM image of the Fe-NCB catalyst of FIGS. 1 and 2.
Figure 4:
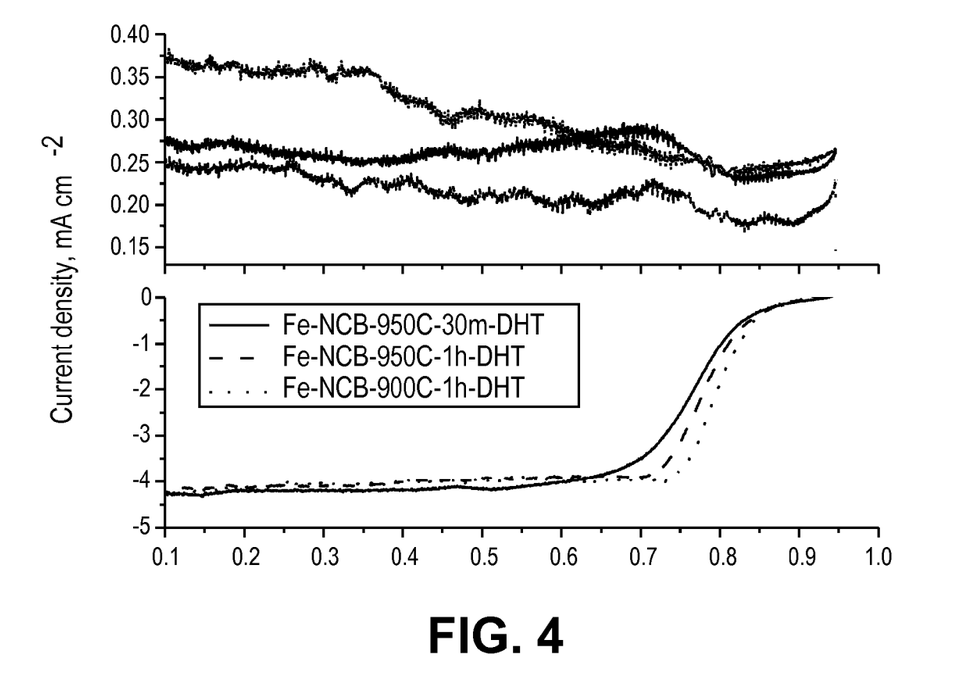
FIG. 4 shows that RRDE data (ring current-top and disk current-bottom) of catalysts produced using the methods described herein with various heat treatment protocols.

The SEM image in FIG. 1 shows that the Fe-NCB catalyst has several levels of porosity, which originates from the removal of SiO2 nanoparticles as well as morphological defects formed during nicarbazin decomposition. TEM (FIG. 2) show very transparent open structure with repetitive morphological units. High resolution TEM (FIG. 3) shows graphitic planes along with amorphous type of carbon. EDS analysis confirms the presence of Fe while no observable metal particles in TEM images points towards extremely small homogeneously distributed iron particles throughout the nitrogen enriched carbon network. High resolution XPS spectra show that the amounts of nitrogen (4.7 at %) and iron (0.39 at. %) are similar to other M-N—C electrocatalysts. The sample has significant amounts of pyridinic nitrogen (398.8 eV) as well as Fe—$N_x$ centers (399.6 eV) which previously have been linked to higher activity of ORR electrocatalysts. FIG. 4 shows that RDE data of various heat treatment protocols. As shown, the Fe—NCB heat treated at T=900° C. for 1 hour has a value of $E_{1/2}$=0.8V, which is signficantly higher than many other non-PGM catalysts tested under the same conditions.

A batch of Fe—NCB materials was synthesized using the methods described above using a first heat treatment step of T=900° C. for 1 hour was tested in order to validate the high performance and durability of this promising catalyst under automotive performance and durability cycling that simulate actual stack conditions.

Figure 5:
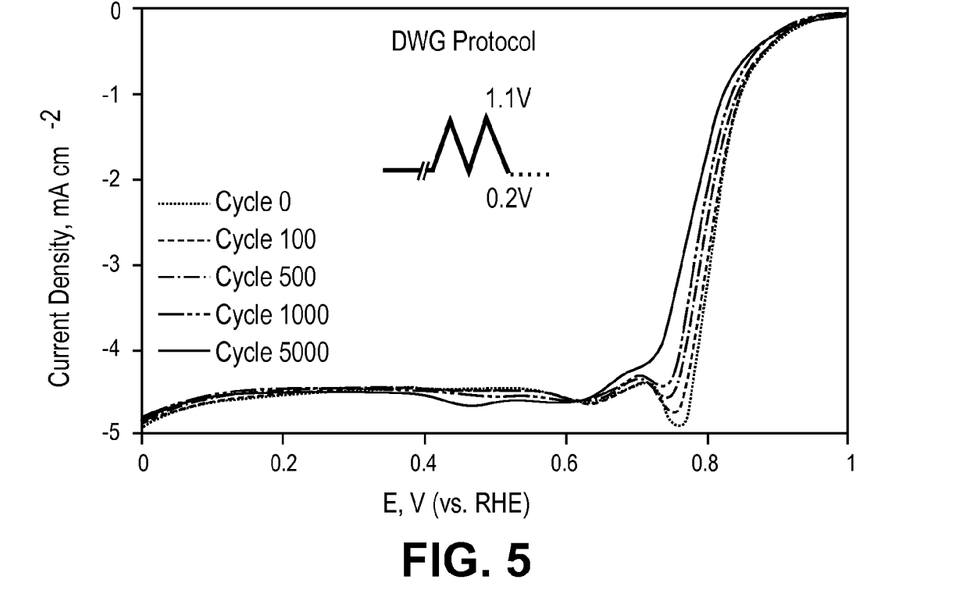
FIG. 5 shows RDE measurements of the durability of a catalyst produced using the methods described herein measured with a DOE Durability Working Group (DWG) proposed protocol.
Figure 6:
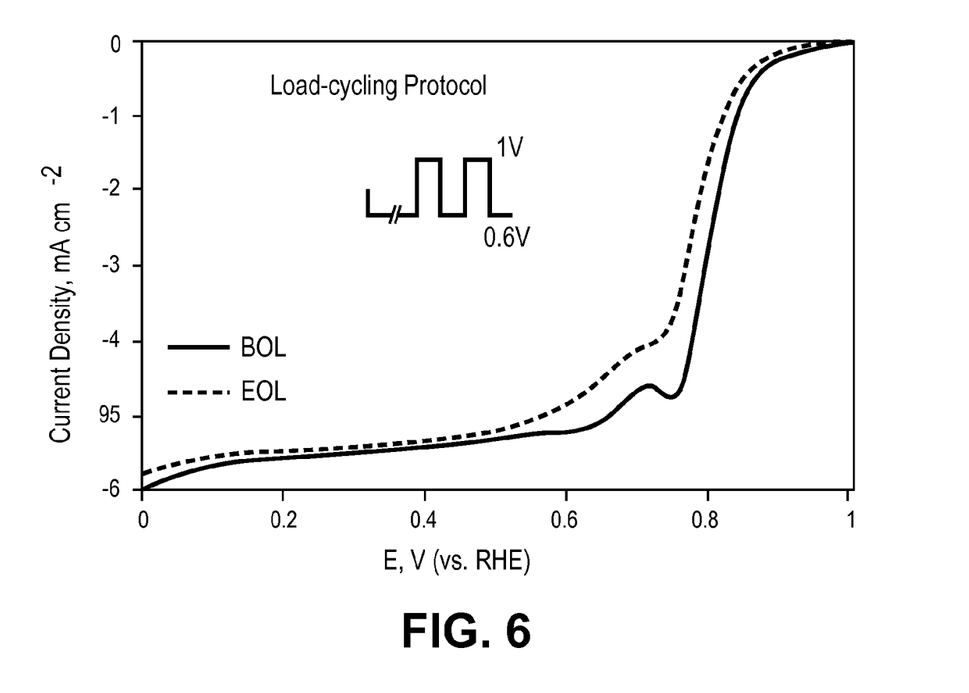
FIG. 6 shows RDE measurements of the durability of the catalyst produced using the methods described herein measured with a load cycling protocol.

RDE measurements of the catalyst sample (FIGS. 5 and 6) using a DOE Durability Working Group (DWG) proposed protocol (FIG. 5) and a load-cycling protocol (FIG. 6) revealed a high kinetic current density at 0.8V of $i_k$=4.6 mA $cm^{-2}$ with a Tafel slope of 52 mV/decade. The Fe—NCB sample also showed an active reduction peak at around 0.75V, which might be associated with the active site of the catalyst. Under durability tests, the catalyst presented an $E_{1/2}$ drop of only 3-4% from the initial value, indicating excellent durability.

Figure 7:
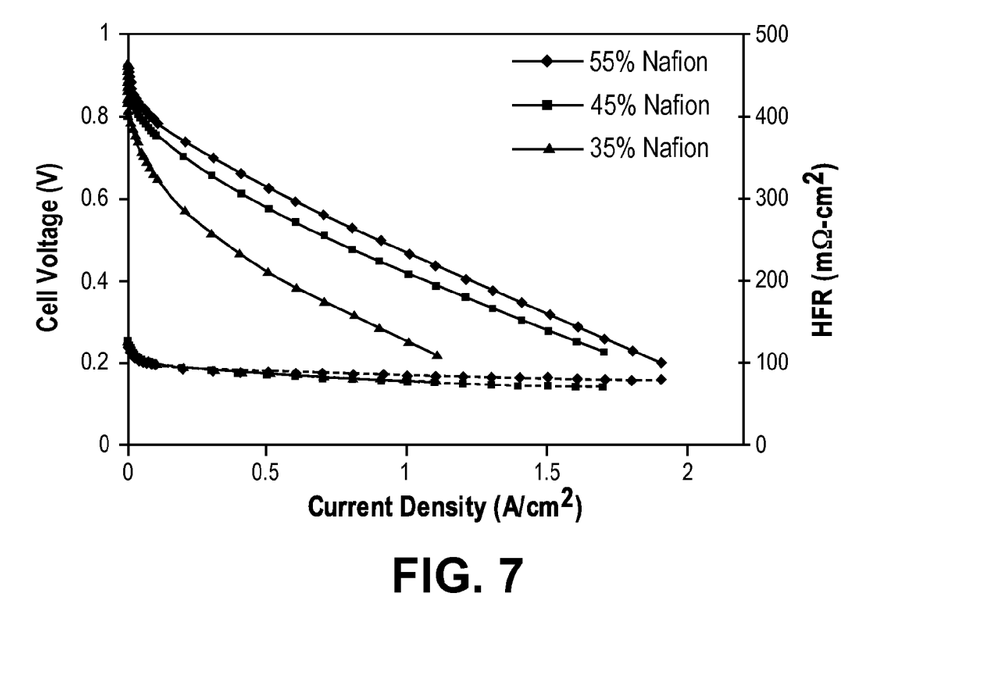
FIG. 7 shows MEA performance data of the Fe-NCB catalyst prepared using the methods described herein with varying Nafion content under the recommended DOE conditions of $H_2/O_2$ operation, 100% RH, and 1 bar $O_2$ partial pressure (1.5 bar total pressure or 0.5 barg backpressure).
Figure 8:
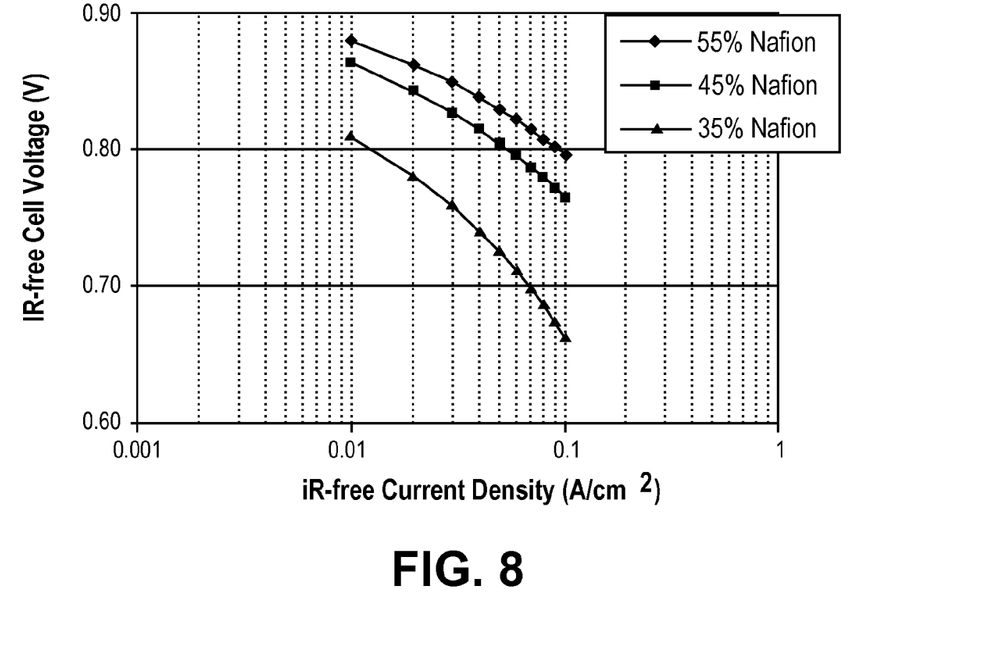
FIG. 8 shows kinetic current density of the Fe-NCB catalyst prepared using the methods described herein with varying Nafion content under the recommended DOE conditions of H$_2$/O$_2$ operation, 100% RH, and 1 bar O$_2$ partial pressure (1.5 bar total pressure or 0.5 barg backpressure).
Figure 9:
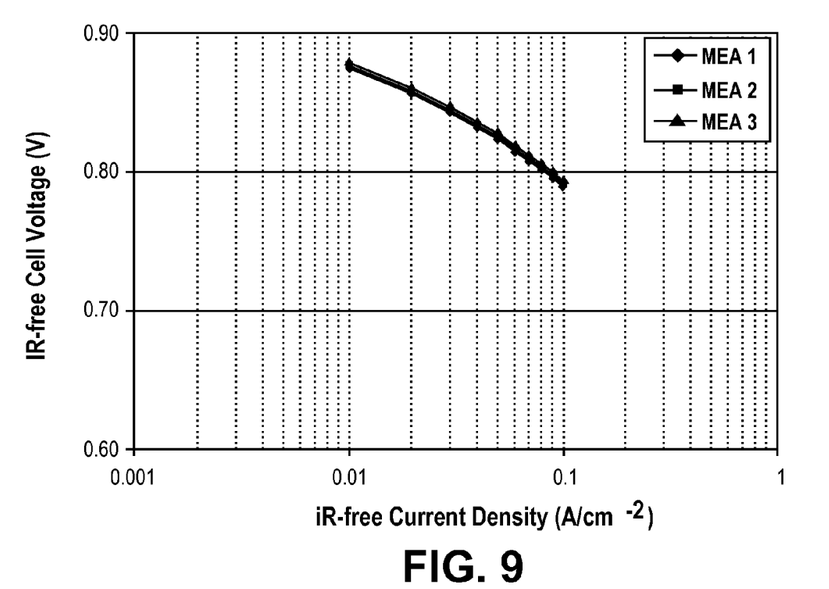
FIG. 9 demonstrates the reproducibility of the kinetic current densities of three different MEAs containing the Fe-NCB catalyst produced using the methods disclosed herein with 55% Nafion. Conditions: Tcell=80° C., 100% RH, 0.5 bar back pressure.

RDE evaluation is a powerful tool for measuring catalyst activity, but MEA testing in an operating fuel cell provides a more realistic estimation of overall performance FIGS. 7 and 8 show the MEA performance of the Fe—NCB catalyst under the recommended DOE conditions of $H_2/O_2$ operation, 100% RH, and 1 bar $O_2$ partial pressure (1.5 bar total pressure or 0.5 barg backpressure). Three MEAs with the same catalyst loading of 4 mg/$cm^2$ but different Nafion content were investigated. The open circuit voltage (OCV) was 0.92V and did not change with increasing Nafion content. FIG. 7 shows that increasing the ionomer content from 35% to 55% significantly changes the iV performance. The poor iV performance of the 35 wt % Nafion MEA may be attributed to incomplete Nafion coverage of the non-PGM active sites. Better ionomer coverage was achieved upon increasing the Nafion content to 45% and 55% as evidenced by the significant improvement in the iV curve. Increasing the ionomer content from 45% to 55% resulted in further increased kinetic currents. As shown in FIG. 8, the MEA containing the Fe—NCB catalyst with 55% Nafion gave kinetic current of 100 mA cm–2 at 0.8 ViR-free. This is the first report of a fuel cell performance that meets the current DOE design target for non-PGM cathode PEMFC catalysts for potential future automotive applications. This result was reproduced using three MEAs from different catalyst batches as shown in FIG. 9. The reproducibility of the high current densities obtained with this catalyst is confirmed by the overlapping Tafel plots. To the best of our knowledge, this is the first report of a non-PGM catalyst achieving such high current density values at 0.8 ViR-free using Nafion NRE211 membrane, a significantly thinner membrane than Nafion 115 or Nafion 117, which is typically used by other research groups working on non-PGM catalysts.

Figure 10:
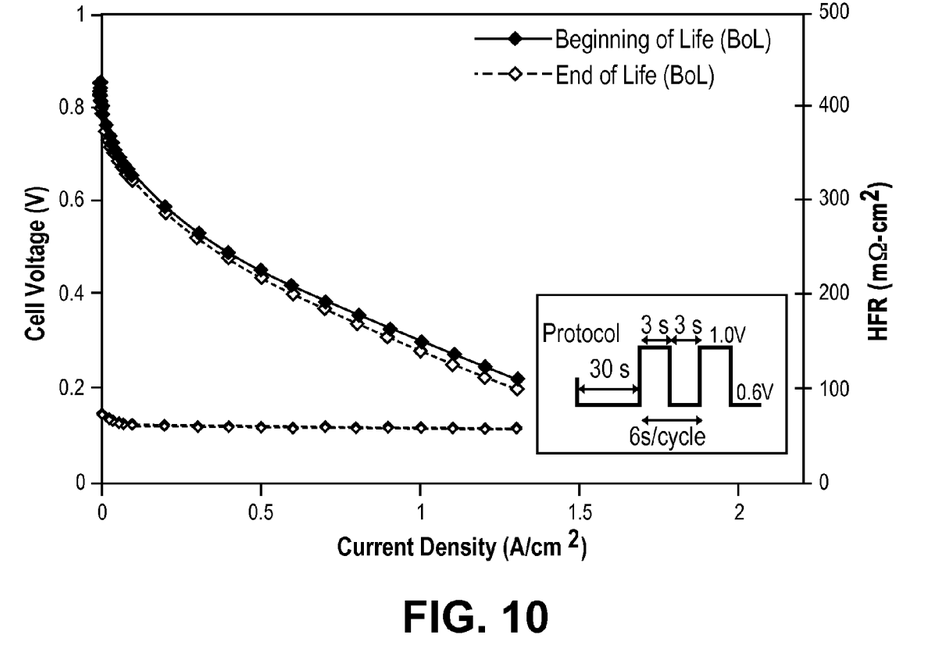
FIG. 10 shows durability data of the Fe-NCB non-PGM catalyst prepared using the methods described herein with 45% Nafion under a load-cycling protocol. Conditions: Tcell=80° C., 100% RH, 0.5 bar back pressure.

We have also evaluated the durability of the Fe—NCB catalyst using automotive accelerated stress tests (ASTs) that simulate the actual stack conditions under FECV operating conditions. The catalyst showed excellent durability with polarization performance undergoing minimal change after 10,000 potential cycles (shown in FIG. 10 for the 45% Nafion sample). All MEAs that were tested under the load cycling protocol showed the same durability regardless of Nafion content. The difference in the beginning of life (BoL)

iV curve in FIG. 10 and the corresponding curve in FIG. 9 for the 45% Nafion MEA are attributed to MEA to MEA differences.

What is claimed is:

1. A method for forming a material comprising:
   combining a transition metal precursor and a charge transfer salt precursor under suitable conditions to initiate polymerization of the precursors, thereby forming a polymer comprising the charge transfer salt and the transition metal; and heat treating the polymer.

2. The method of claim 1 wherein the metal precursor is a precursor of iron.

3. The method of claim 2 wherein the metal precursor is iron nitrate.

4. The method of claim 1 wherein heat treating comprises pyrolysis.

5. The method of claim 1 wherein the transition metal precursor and charge transfer salt precursor are combined in the presence of a dispersed supporting material.

6. The method of claim 5 wherein the dispersed supporting material is a dispersed sacrificial support.

7. The method of claim 6 further comprising removing the dispersed sacrificial support to produce an unsupported catalytic material.

8. The method of claim 1 wherein the suitable conditions comprise ball-milling.

9. The method of claim 1 wherein the charge transfer salt is insoluble.

10. The method of claim 5 wherein the supporting material is insoluble.

11. The method of claim 1 wherein the charge transfer salt is nicarbazin.

12. The method of claim 1 wherein the charge transfer salt is selected from the group consisting of, tetrathiafulvalene, and multiferroics.

13. A catalytic material comprising a metal and a substantial portion of carbon derived from a charge transfer salt.

14. The catalytic material of claim 13 wherein the catalytic material is unsupported.

15. The catalytic material of claim 13 wherein the charge transfer salt is nicarbazin.

16. The catalytic material of claim 13 wherein the charge transfer salt is selected from the group consisting of, tetrathiafulvalene, and multiferroics.

17. The catalytic material of claim 13 wherein at least a portion of the catalytic material is insoluble.

18. A material formed by:
   providing a plurality of dispersed sacrificial template particles;
   reacting a metal precursor and a charge transfer salt precursor onto the sacrificial template particles to produce dispersed precursors;
   heat treating the dispersed precursors; and
   removing the dispersed sacrificial template particles to produce a highly dispersed, self-supported, high surface area material.

19. The method of claim 18 wherein the step of reacting the metal precursor and charge transfer salt precursor comprises ball-milling.

* * * * *